(12) United States Patent
Thiele et al.

(10) Patent No.: US 8,622,307 B2
(45) Date of Patent: Jan. 7, 2014

(54) IDENTIFICATION SYSTEM AND APPLICATIONS

(75) Inventors: Jan Thiele, Chemnitz (DE); Sascha Voigt, Bemsdorf (DE); Andre Kreutzer, Mittweida (DE); Matthias Foerster, Dresden (DE)

(73) Assignee: Printechnologies GmbH, Chemnitz (DE)

( * ) Notice: Subject to any disclaimer, the term of this patent is extended or adjusted under 35 U.S.C. 154(b) by 90 days.

(21) Appl. No.: 13/127,512

(22) PCT Filed: Nov. 4, 2009

(86) PCT No.: PCT/DE2009/001557
§ 371 (c)(1),
(2), (4) Date: Jul. 1, 2011

(87) PCT Pub. No.: WO2010/051802
PCT Pub. Date: May 14, 2010

(65) Prior Publication Data
US 2011/0253789 A1     Oct. 20, 2011

Related U.S. Application Data

(60) Provisional application No. 61/113,407, filed on Nov. 11, 2008, provisional application No. 61/121,975, filed on Dec. 12, 2008, provisional application No. 61/122,473, filed on Dec. 15, 2008.

(30) Foreign Application Priority Data

| Nov. 4, 2008 | (EP) | 08075863 |
| Nov. 16, 2008 | (DE) | 20 2008 015 342 U |
| Dec. 5, 2008 | (DE) | 20 2008 016 187 U |
| May 15, 2009 | (EP) | 09075230 |

(51) Int. Cl.
*G06K 19/02*     (2006.01)

(52) U.S. Cl.
USPC ........................................................ 235/488

(58) Field of Classification Search
USPC ........................................................ 235/488
See application file for complete search history.

(56) References Cited

U.S. PATENT DOCUMENTS

| 5,159,181 A | 10/1992 | Bartels et al. |
| 6,357,664 B1 * | 3/2002 | Zercher ......................... 235/488 |
| 2010/0301117 A1 | 12/2010 | Huebber et al. |

FOREIGN PATENT DOCUMENTS

| DE | 10 2006 048401 A1 | 4/2008 |
| EP | 0 422 482 A2 | 4/1991 |
| WO | 2005/027032 A1 | 3/2005 |

*Primary Examiner* — Jamara Franklin
(74) *Attorney, Agent, or Firm* — Joyce von Natzmer; Agris & von Natzmer LLP (57) ABSTRACT

The invention relates to an identification system, comprising an information carrier or a group of such information carriers, which allow a clear association of information. The invention further relates to the use of said information carriers, and to a device for reading said information carriers, wherein the information carriers are associated with a random action of a data processing system by way of the structured information layer thereof or can trigger such action. The invention furthermore relates to information carriers for access control systems, payment systems, ticket systems, and marketing application. According to the invention, overlaps of the information layer can be provided by applying additional layers, which achieve several advantages according to the invention, such as optically rendering the information layer unrecognizable, and resulting increased safety of the information carrier against manipulation. In addition, the information layers can be applied in an absolutely level and thin manner onto the carrier material, which enables unlimited further processing.

22 Claims, 10 Drawing Sheets

IDENTIFICATION SYSTEM AND APPLICATIONS

This is the U.S. national stage of International application PCT/DE2009/001557, filed Nov. 4, 2009 designating the United States and claiming priority to EP 08075863.4, filed Nov. 4, 2008; DE 20 2008 015 342.5, filed Nov. 16, 2008; DE 20 2008 016 187.8, filed Dec. 5, 2008; and EP 09075230.4, filed May 15, 2009.

The invention relates to an information carrier, comprising an electrically non-conductive substrate, an electrically non-conductive adhesive layer and an electrically conductive information layer, and at least another layer covering at least the area of the substrate with the structured information layer is arranged. Preferably the invention relates also to an identification system consisting of an information carrier or a group of such information carriers and a reading device, allowing a clear association of information, whereby the information carriers can be associated with a random action of a data processing system by way of the structured information layer thereof or can trigger such action.

The current state of the art offers several methods to produce information carriers by means of printing techniques or other coating processes which can be read using a suitable reading method or reading device. The most prevalent information carriers manufactured in this manner are bar codes produced as a one-dimensional bar code or, for example, as variants produced in two dimensions. These are read with suitable optical scanners and if necessary processed further through appropriate data processing systems.

The printing techniques and coating technology for the production of such features are also developing further. Thus, the EP 1 803 562 describes a method for the transfer of image-bearing layers from a carrier foil or transfer foil to printed sheets in a sheet processing machine. Thereby an adhesive is applied in a first coating device and run together with a transfer foil in another coating device and material is applied by adhesion from the transfer foil onto the printed sheets. A transfer gap is formed in the coating device and the transfer foil is laid along the top of the press drum with the side coated with transfer material on a printed sheet and fed together with it under pressure through the transfer gap, so that the image-bearing layers are transferred from the carrier foil onto the printed sheets in areas covered with adhesive. Bar codes and alphanumeric information can thus be applied easily.

In document DE 10 2008 013 509 A1, a steganographical method is described, which can make invisible safety features in printed products visible by means of this transfer foil technology. The verification or visualisation of these features is carried out optically using a decoder, which accordingly functions as a reading device. Furthermore a resistive safety feature is known from DE102006031795A1, which was produced by means of transfer foil technology. In this method, resistances or resistance networks are introduced into printed products to show a safety hallmark. The verification is carried out by contact using a reading device, which measures the resistances according to the ohmic principle.

An information carrier produced by means of transfer foil method according to the invention, its combination with a reading device to give an identification system and applications of the system resulting from it according to the claims of the invention are, at present, not known.

Furthermore, flat printed materials according to the current state of the art are disclosed in U.S. Pat. No. 5,818,019, U.S. Pat. No. 3,719,804, U.S. Pat. No. 4,587,410 and US 2006/0118612, which permit safe verification or validation of data. This can, for example, be meaningful for medicines and their packagings but also for lottery tickets. The printed information ensures, for example, the authentication or serves in verifying the validity. Also capacitance-sensing information carriers are known from the applications U.S. Pat. No. 3,719,804 (permanent information storage device) and U.S. Pat. No. 4,587,410 (park system) among others. In the last-named example, the processing and changeability of capacitance for a parking meter is shown. Using a mechanical unit, the capacitance in the reading device is modified gradually and thus its "inner value" changed. An individualisation of the structures is not planned. The complete system is a self-sufficient system without interaction with other systems, data processing or data storage. In U.S. Pat. No. 3,719,804, the production possibilities are shown using printing technologies such as, for example, screen printing, flexo printing and gravure printing. The description refers to materials which can be processed in liquid form and which are suitable for printing processes. This is beset with all the problems which are associated with inks that can be processed in liquid form. The inks which overcome them are very expensive, contain solvents, have a limited life and cause process-technical problems. The individualisation is carried out by means of separation techniques of the applied conductor tracks. The reading procedure is strongly position-dependent and is linked to a fixed reading position of the information carrier in the reading device.

To summarise, the solutions in the current state of the art present several disadvantages. They are, for example, not economical enough for large-scale application, they can be recycled only incompletely due to their complex construction (RFID systems), they are at times easy to copy (bar codes), they cause high costs through attachment to the end product or they can either only be processed further with regard to printing technology with difficulty or not at all (chip cards).

It was therefore the objective of the invention to provide an economical and efficient information carrier, which enables easy handling as well as an extremely economical, accurate reading and evaluation principle and achieves a protection against copying and maximum protection against manipulation.

Surprisingly, the objective is achieved by the independent claims. Preferred implementations result from the subsidiary claims.

It was completely surprising that an information carrier could be provided which does not show the disadvantages of the current state of the art. The information carrier according to the invention comprises an electrically non-conductive substrate with an adhesive layer which is electrically non-conductive and applied to one or more areas at least, on which an electrically conductive information layer which has at least one layer is arranged. Furthermore, at least one other layer covering at least the area of the substrate with the structured information layer is arranged on the information carrier, preferably a paper layer and/or a foil layer and/or a colour layer and/or a lacquer layer or combinations thereof.

The information carrier preferably consists of an electrically non-conductive substrate, followed by a preferably electrically non-conductive adhesive layer applied to one or more areas at least. The adhesive layer is followed by an electrically conductive information layer having at least one layer. Preferably any electrically conductive or weakly conductive materials can be considered as materials for the information layer. Preferably metals (for example aluminium, copper, iron etc.), graphite, soot and/or dielectric materials can be considered. Combinations of these materials or even alloys are also possible. Even doped semiconducting materials or conductive synthetic materials are conceivable. The materials possible for the information layer are almost exclusively solids and therefore abrasive. In existing direct printing processes for the direct application of conductive layers, forms and tools for layout are strongly limited in their shelf life (life time) and wear out. It was completely surprising that the rubber blankets and other tools for the application of the adhesive could work almost free from wear and tear and thus the information layer could be applied without damaging the tools. After several million information carriers, no degradation or fuzziness could be found in the reproduction of the information layer, so a fundamental flaw in the current state of the art could be eliminated. Expensive tools, the change in the machine (working time) and the raw materials for the production of tools can therefore be saved and thus represent, completely surprisingly, an outstanding cost benefit of the invention.

There should be at least one additional layer on the information layer, comprising at least an adhesive layer and/or at least a paper layer and/or at least a colour layer and/or a lacquer layer and/or a foil. Of course, it is also conceivable to apply combinations of these. All electrically non-conductive materials are possible as substrates, such as paper, cardboard, derived timber products, composite materials, laminates and/or synthetic materials. It was surprising that by the preferred embodiment an information carrier can be provided, which shows a large storage capacity and in addition a high stability and shock resistance. Thus the carrier for example can be easily transported and dispatched.

The information carrier designed according to the invention enables various applications and therefore has numerous fields of use. These include, for example, applications in the advertising and marketing areas or in ticketing. A printed product thus contains an information layer which, in combination with a reading device, makes further information (e.g. from the internet) accessible or can even trigger actions. It was completely surprising that the system designed according to the invention makes an extended range of products possible for suppliers and they can moreover be changed or adapted very quickly. This represents an increase in the technical possibilities. For example, in a conversation across the counter in a bank or post office, the employee in question can, without spending much time on advisory services, give the customer the information carrier which the latter then studies at home at his/her leisure and informs himself/herself about offers and contents of the information memory. The readable contents or the actions to be triggered can be changed or adapted at any time. If this information were put in purely printed products, they would have to be printed and distributed afresh with every change. This is not necessary with this solution and much effort, time and costs are saved, and the information is always up-to-date. Counter employees are often asked to give advertising and information brochures (as pure printed products) to the customers at the end of the normal counter process. Often the customer is presented with further offers of insurance policies, banks, offers for travel, consumer goods of all types or special campaigns, in the form of brochures or so-called flyers. This form of advertising with conventional printed products is severely limited in its information content. By contrast, the information carriers provided by the invention enable the use of the full range of promotionally effective effects such as images, sound and combinations of both, with the help of suitable data processing systems to which the reading devices can be attached. Such data processing systems can preferably be computers, mobile telephones, consoles or other systems. In the simplest case only a reading device and an information storage is necessary. In a particularly preferred embodiment, a reading device is attached to the data processing medium. The information carrier will then make its stored information available through the reading device and, for example, open the virtual contents. The information content is almost infinite. For example, with an Internet page opened with the information carrier, the complete virtual world can be made accessible and the user can explore it further and offers beyond those initially made in the information carrier can be made.

Overlaps to the information layer can preferably be provided by the application of further layers which can achieve several benefits, such as visual blanking out of the information layer and a resulting increased protection against manipulation of the information carrier. Moreover, the information layer could surprisingly be applied so thinly, that a simple and economical further processing or refining can take place. Thus, further layers can be applied without there being interactions with the information layer and the information layer remains completely undamaged.

Surprisingly, it turned out that the complex information storage and information carriers are only insignificantly more expensive than the pure printed products and hence they are orders of magnitude cheaper than CDs or other forms of information storage. It has to be taken into consideration, however, that the information storage can be expanded or changed at any time. The information carrier saves on raw materials and improves the effectiveness of the data transmission. Furthermore, the information can be presented across different media. Whilst a journal has an editorial deadline after which no changes can be made anymore as the journal goes to print, the internet allows for a continuous adaption of the contents and further treatment of topics which cannot be achieved by pure printed products.

The use of the identification system in the invention will be described using the actual example of a magazine dealing with historical issues. The first issue of the magazine is dedicated to a topic, for example the topic "Egypt". A reading device and the first information carrier are included in this issue. The buyer of the journal reads the journal in the usual way and finds references to further contents which he/she can access by using the reading device, data processing medium and corresponding information carrier. For example, the reader can see a virtual pyramid from the inside or get a three-dimensional view of buildings which would not be possible at all, or only to a limited extent, using a pure printed media product. In addition, the publisher may offer further information carriers or content which may be directly linked to the topic "Egypt", or which may have nothing to do with it at all. Examples of direct links include further reading on the topic, competitions related to the topic (chance of winning a trip to Egypt), books, CDs, DVDs, movies etc.

The promotion of sales across various media types is called cross-promotion. It is a special form of promotion which uses at least two advertising communication channels and communicates a consistent message to a target group that has an interest in both (or all) media types. This can significantly reduce the advertising costs while at the same time achieving a greater advertising volume. Furthermore, a joint initiative can be coordinated better in advance in order to avoid conflicts of interest and competition effects. In connection with the system according to the invention, for example, advertisement and information messages could be placed by a tourism operator in Egypt, a museum which currently has an exhibition on Egypt, a film-maker who has just made a film in or about Egypt and a restaurant specializing in Egyptian food, all of whom would then profit from the cross-promotion together with the publisher who publishes these topical journals. In this case, the advertisers would attach their own information carriers to the topical journal which would call upon the advertisers' contents and make it available through the reading device. If there are unexpected events or changes, for example a temporary closure of the museum due to building works, then the information can be virtually changed and updated within seconds and the client is always up-to-date and has more recent information than the traditional print media can offer, as the printed information cannot, or only to a very limited degree, be corrected, changed or amended. It is surprising that the full surface area (single and double sided) of the information carrier can be used as a print media without any optical limitations which would be imposed by bar codes and the like. In other words, the information carrier can also be used as a print product. This allows for the realization of high quality collector cards or topical collections which could then be exchanged, collected, used or sold just like stamps. Surprisingly, tests have shown that the information carriers can be discarded or recycled just like pure printed products once they are no longer required by the user. This saves raw materials and reduces production costs, which in turn is reflected in a lower purchase price.

Its use is particularly advantageous in direct connection with so-called virtual items, i.e. items which have a real economic value and are thus tradable, but which only exist in a virtual display or environment. Examples include the so-called online worlds such as "Second Life®" or other massively multiplayer online (role-playing) games. In another useful application, the information carriers can be used for downloading music, videos, texts, data or e-books; or for bonus stamps and similar programmes. Furthermore, it is not always actually necessary to download these contents. The information carrier of the invention can also serve as a key to access such information without necessarily having to transfer them through data lines.

It is particularly advantageous if the information carrier is part of a printed product, for example a media product, newspaper, journal, book or similar. There is a particular benefit for packaging as well. An advantageous use is possible in all circumstances where a clear attribution of information is required or at least advantageous. In a particularly preferred form, the information carrier is part of the printed product and made detachable from this printed product by means of perforations or other predetermined breaking point technologies.

The information carriers can also be used in groups, where several groups or several information carriers can form an identification system. The identification system would preferably contain a reading device which would allow for the information on the information carriers to be read easily and quickly.

The information carrier according to the invention can be produced very economically, refined and tailored for example by using highly productive sheet or reel-fed offset printing techniques. This creates many varying usage possibilities, which for traditional information carriers and/or reading devices would have been too expensive, too complex or simply unsuited given their form. Compared to the state of the art, the information carrier according to the invention presents one of the cheapest options for non-optical information storage. The identification system according to the invention contains at least one reading device and at least one information carrier, where the information carrier consists of an adhesive layer and an information layer; and said information layer being attached through a transfer process, preferably a transfer foil process and, strongly preferably, a cold foil transfer process.

In a further preferred embodiment, the reading device is linked to at least one data processing medium. Examples of such data processing media include computers, PDAs, consoles and mobile phones, without being limited to this list of devices. This ensures the connection of the identification systems according to the invention with other devices and systems which can make use of the information contained on the information carrier. The reading device can easily and quickly be connected with the devices and systems listed above, providing a high degree of flexibility. The information carrier, a group of information carriers and/or an identification system can, preferably in connection with a reading device through its structured information layer, be assigned to or trigger actions of a data processing system, where such an action is made preferably on non-networked data processing systems and strongly preferably on networked data processing systems. According to this invention, the reading installation preferably describes a reading device. The particularly preferred example for such a data processing system is the internet and the data processing systems which are connected to it.

In another preferred embodiment of the information carrier, at least one additional layer covers at least the section of the substrate which contains the structured information layer. This may be, for example, a paper layer and/or a foil layer and/or a colour layer and/or a lacquer layer or any combinations thereof. Surprisingly, adding another layer can easily ensure that the information content is covered and made invisible, but it can also ensure that it is protected from environmental influences such as humidity, temperature, sunshine or mechanical stress. This in turn ensures that the information carrier has a strong durability and is not damaged or even destroyed.

It is preferred that the reading device recognizes an information layer of which at least some segments are on the information carrier, and that the reading device is able to measure the information layer and thus determine the information contents of the information carrier. Compared to the state of the art this is an additional novelty, since not only the existence of information (for example in bit format) can be tested, but surprisingly also its quality. This contributes substantially to the security of the information carrier against manipulation and also represents an increase in the storage depth relative to the available surface area of the information carrier. Examples for this are shown in the figures. At first it is assumed that the information contents of the information carriers are identical. On closer examination (zoom window) it can however be seen that the information a layer (examples shown in the figures) is selectively changed. This has the result that a purely quantitative examination by the reading device shows the same information contents, but a qualitative examination show different information content. For the purpose of qualitative examination of the information layer, capacitative and/or inductive procedures can be used.

In the state of the art, an information carrier in the identification system is bound to exactly one context and thus it is not possible to use an information carrier for a purpose other than the one for which the identification system was originally developed. By including information which describes the interpretation in the information layer of an information carrier, a group of information carriers and/or an identification system, which is to be a description as to how information is to be interpreted in a given context, the context of the identification system can surprisingly be determined by the information carrier itself. This is preferably done by subdividing the information layer into an interpretation-describing segment as the segment of the information layer which contains information for the interpretation, and an information-carrying segment as the segment of the information layer which contains the useable information. "Useable information" here is the information which creates a use, for example, by triggering the reading device to initiate a particular action. An example for this is a reading device which, if an information carrier from a marketing concept is recognized, makes advertisements available in a suitable medium, for example a computer or television, and if an information carrier is recognized to be a business card, makes available the information stored on it to the user, for example through his/her mobile number.

An advantageous form is for the layout or the structure of the information layer to consist of filling areas defined by corners and/or curves, in particular rectangles and/or circles. The reading unit can determine the position as well as the form and/or the surface itself as a component of the structured information layer. The information layer in this represents the information content of a certain number of information carriers. This can be individual units or n-multiples thereof, depending on whether further information carriers exist which possess an absolutely identically structured information layer.

The information layer (and the information content on it) as well as the optical appearance of the information carrier can be designed in different ways. Within a group of invented information carriers:

several information carriers have the same structure of the information layer and at least one identically designed colour layer so that a closed group of information carriers that are the same in terms of information technology and optics is created, several information carriers have the same structure of the information layer and at least one differently designed colour layer, so that a group of information carriers with the same information technology but different optics is created, several information carriers have an information layer with a different structure and at least one identically designed colour layer, so that a group of information carriers, each with its own information technology but with the same optics, is created, several information carriers have information layers with different structures and at least one differently designed colour layers, so that information carriers are created that are completely different from one another, as regards both information technology and optics.

Countless combinations can be generated in this way, which would enable an easy grouping and administration of the information carriers.

Segments of the structure of the information layers in the information carrier can be changed through additive and/or subtractive processes, preferably using inkjet processes and particularly using laser processes. Surprisingly, it turned out that this is particularly advantageous for creating information-technically different contents and individualization of the information carrier. For example, moulding blanks of information carriers can be prepared which allow for automation and mass production. In the ongoing process of the information design, segments can selectively be created or destroyed which only then represent useable information contents or which complement the original information content of the information carrier moulding blank. Using a pure transfer foil technique, information carriers could be produced (depending on the print format) with only limited differences; this is called regionalization. The ability to adapt the information carrier segment by segment can be advantageous in particular in connection with the very selective choice and measurement of information carriers. For example, an information-technically different (as compared to the original state) information carrier can be created through additions, partial removals and/or changes to the material. Examples of such changes, which are not necessarily instantly obvious in terms of optically detectable characteristics, are shown in the figures. Surprisingly, in addition to a partial removal of materials, chemical and/or physical transformation of materials may be used to change measurements and thus change the information content of the information carrier. An example for this is the thermally-induced oxidation of the conductive material aluminum into aluminum oxide, without being limited to this example. Carbon compounds or even conductive materials such as for example PEDOT:PSS (Poly(3,4-ethylenedioxythiophene) poly(styrenesulfonate)) surprisingly yielded very good results as well. For the first time it was possible to analyze information carriers not only horizontally but also vertically, since material is partially added and partially removed in this process. This leads to the possibility of providing an increased data density on a similar surface of such data carriers.

It is also preferred to add other optical, electrical, electronic, sensory and/or acoustic elements on the information carrier. In order to realize further functions within the information carrier according to the invention, conductor tracks and electrical elements such as batteries, displays, sensors etc. can be attached using suitable additive procedures. Depending on the element and procedure used, it may be preferable to do the addition prior to or after creating the structured information layer. For this, the elements and their circuits can be present both individually as well as galvanically coupled with the structures of the information layer. It may also be preferred that the substrate in the initial state of the processing already contains elements, or parts thereof. Examples for this include piezoelectric substrates (PVDF foils) or substrates with piezoelectric content materials or segments.

In a particularly preferred option, secondary information is attached to or contained in the information carrier, which in particular makes it possible to determine the orientation or speed of the information carrier relative to the reading device. This is particularly advantageous in order to read the information content without error or even just to start the reading process. In connection with dynamic information carriers, which are read during or through a movement, the reading speed can be determined through secondary information and thus defined it can start and stop the reading process. Secondary information may, for example, also be security characteristics which can be read inductively, resistively and/or capacitatively without being restricted to these physical mechanisms. An example of such a security characteristic is shown in the figures.

In another preferred embodiment of the information carrier, it is possible to superimpose or introduce features and/or elements which contain additional optical information, in particular printed values, symbols, signs, security and/or authenticity features, in particular on playing cards and/or collectors' cards. Using this additional information it can, surprisingly enough, be guaranteed that testing criteria are added which ensure the unambiguous validity of the information carrier even without a reading device. These may, for example, be mirror film elements, holograms, microscripts, watermarks and other security features according to the state of the art. Thus by simple means it can be ensured that, through an optical examination that is simple and, in particular, rapid, the genuineness of the carrier can be demonstrated.

In a preferred version, no expensive additional devices will be necessary for this.

For example, a capacitive reading device can be used to decode or read out the information layer that has been applied. In this case, it is preferable that the structured information layer of an information carrier, a group of information carriers and/or an identification system, via a reading device whose electrodes are designed and arranged in such a way that the number and/or size and/or form and/or position of the structured information layer of the information carrier(s), can be recognized, retrieved and further processed. Here, the active surfaces (i.e. reading electrodes and/or condenser surfaces) are designed in such a way that the information of the information carrier can be read out unambiguously. Preferably, in the read-out process, the information carrier will be a component of the reading device or a component with the arrangements of the reading electrodes in the latter. Accordingly, places in the reading device that are covered by the information carrier are designated as 1 and places that are not present as 0 (bit principle). Naturally, in this case, a mirroring is also possible, i.e. a 1 means no covering and 0 means covering. The reading device as a component of the identification system can in addition, via specially adapted reading-device surfaces (shown, by way of example, in the figures) with integrative, summing and differentiating capabilities, which follow not (only) the bit principle, determine the information content. Accordingly, the invention also concerns the use of an information carrier of this kind in which the structured information coating is, via a reading device whose electrodes are designed and arranged in such a way that the number and/or size and/or form and/or position of the structured information layer of the information carrier(s), recognized, retrieved and further processed. Above and beyond the familiar bit principle, this is a novelty introduced by the invention in the identification system and constitutes the opening up of a new technical field.

In a particularly preferred embodiment, the use of an information carrier, a group of information carriers and/or an identification system is described, in which the carrier is assigned to a record in a data processing device and this remains constant or is changed in the course of its use. Surprisingly enough, the preferred embodiment can be used specially for credit balance accounts or, in general, for contents and/or actions that change dynamically, in which case the information will preferably be stored dynamically on the information carrier. The information carriers can thus be used in many ways. On the other hand, there are static records that always remain the same.

An example of such a use is found in tickets for the use of public transportation, such as trains, trams, buses, etc. An information carrier can function as a 10-trip card, which is reduced in number with every use. Unlike the stamping system which is often encountered on trams or buses, there is no change in the information carrier (either optically or functionally) but a change in a record located beneath and subordinated to the information carrier. The use and/or the record can in this case also accept situations that it had previously, i.e. can be reversible. The example here would be a reloading of the ticket.

As a further example, the use of an information carrier as a card for prepaid mobile phones could be mentioned. In this case, a customer would purchase such a card in a shop and use the credit in whole or in part by means of a reading device. If all the credit is used, the card would be empty and would not release any further amount if used again, the record having been updated accordingly. However, it could also be restored to its original situation by loading the card again. Here we refer to a dynamic (changeable) record which is altered in the course of the card's use.

In particularly preferred uses, the information carriers, groups of information carriers and/or identification systems can be employed in particular as playing cards, collectors' cards, stamps, franking, postage, goods routing, goods tracking, admission, entry cards, access to closed areas, virtual contents, marketing applications, customer loyalty, lotteries and games of chance, member identification, time cards, payment applications, certificates of authenticity, certificates, forgery protection, copy protection, signatures, delivery certificates, objects involved in computer games, music/video/e-book downloads, bonus stamps/programmes or gift cards. Other possibilities for use are not excluded. Surprisingly enough, the information carrier is permissible in differing areas and can be used in varying ways, with no significant modifications being required for its use. As a result, the information carrier can preferably be mass-produced on advantageous terms.

The advantages of its use include, for example, a high degree of automation, extreme difficulty in duplication, high degree of security, very good value, reliable identification system and recyclable information carrier, which can be further refined as desired. Other advantages may also emerge, resulting from the respective use. Thus, for example, further customer information can be collected and, possibly, optimized marketing offers can be made. Many products, especially printed products, are seldom or not at all of any importance beyond their optical function. In very simple cases, voucher codes or other information are shown in order to have other offers, information, etc. reach the user over the Internet. These codes are easy to copy, must be typed in and provide no direct access to the desired information. These undesirable features can be surmounted by the identification system according to the invention.

The information carriers, groups of information carriers and/or identification systems can also preferably be characterized in their use by the fact that only in combination with at least one other information carrier is the information content completed and the coordination with another record is thereby released. This is especially advantageous with data codes or if it should be necessary to increase the information content. For example, two users at two different places could each use an information carrier within the framework of the identification system in accordance with the invention in order to open a chat room jointly, to settle a transaction (with joint accounts), to call up a joint game and to identify themselves, etc. It is evident that more than just two of these information carriers can be combined in this way. Through the flexible and simple adjustment of the information carriers, the technical possibilities for the use of the information carriers are essentially unlimited.

It is further preferred that the reading device of the information system possesses either a well, a slit and/or a surface to receive at least part of the information carrier and that the information carrier is required to be, or may be freely, positioned in, at, or on the reading device.

The invention will be explained below by way of example with the aid of figures, without, however, being limited by them. The figures show:

FIG. 7 2$^{nd}$ example of a reading device

FIG. 8 5$^{th}$ example of an information carrier

FIG. 9 6$^{th}$ example of an information carrier

FIG. 10 3$^{rd}$ example of a reading device

Figure 1:
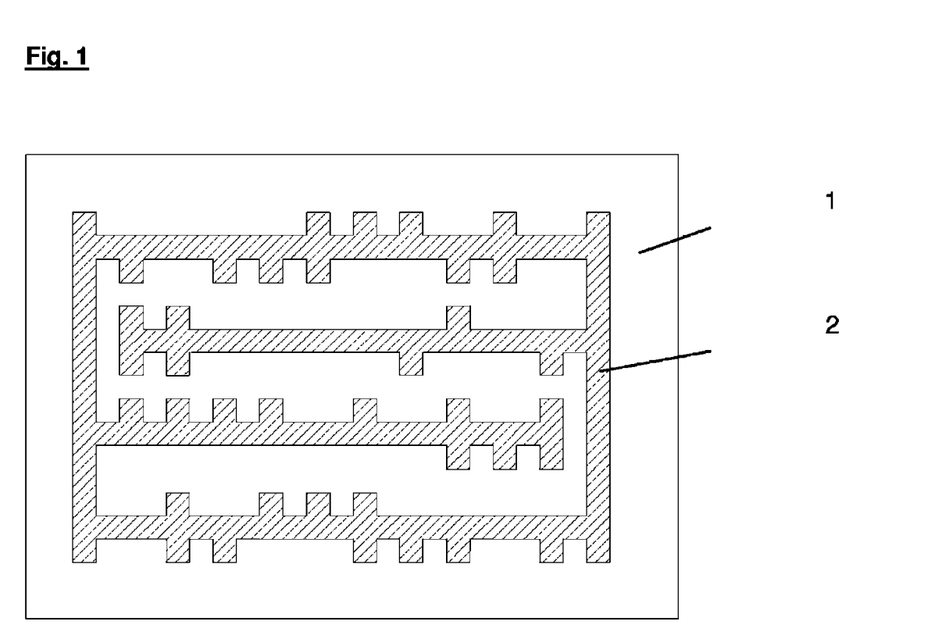
FIG. 1 $1^{st}$ example of an information carrier

FIG. 1 shows an example of an information carrier. An information carrier is shown consisting of a substrate 1 and an information layer 2.

Figure 2:
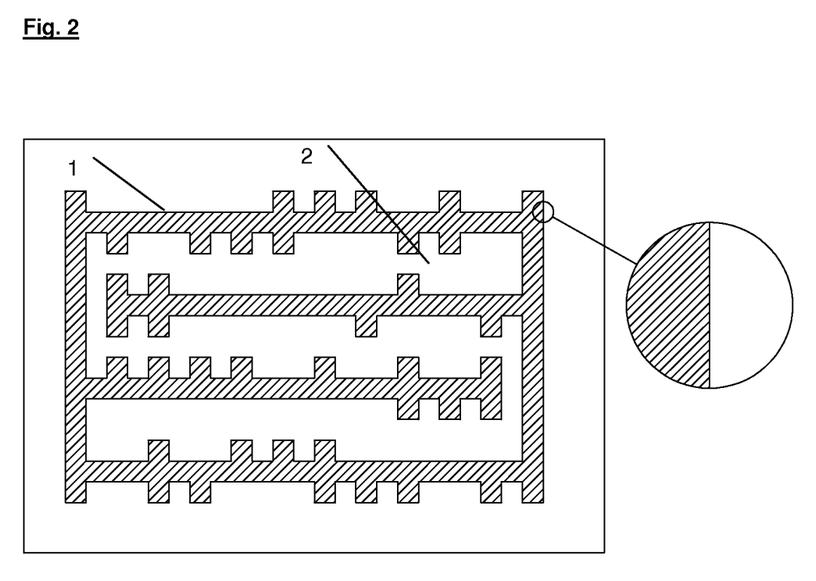
FIG. 2 $2^{nd}$ example of an information carrier

FIG. 2 shows a second example of an information carrier. It is a sketch of an information carrier, consisting of a substrate 1 and an information layer 2.

Figure 3:
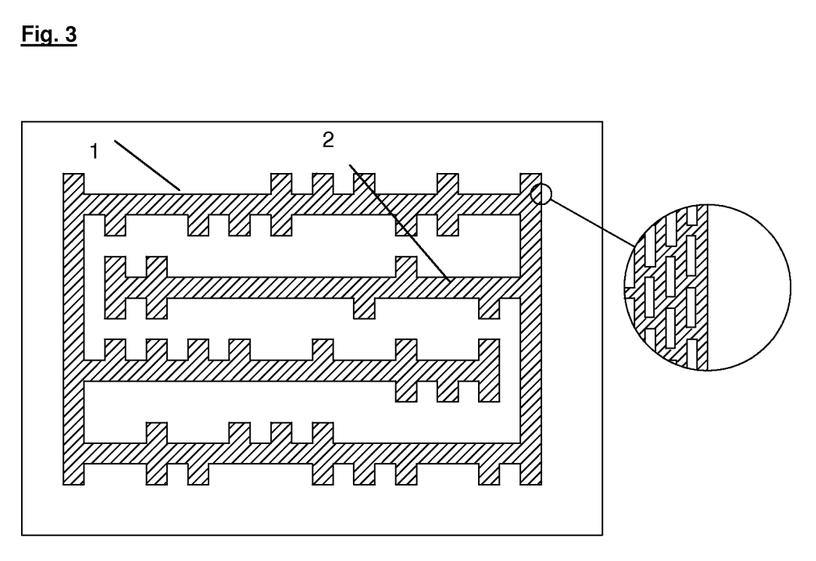
FIG. 3 $3^{rd}$ example of an information carrier

FIG. 3 shows a third example of an information carrier. The information carrier consists preferably of a substrate 1 and an information layer 2. In this case, the information layer 2 is, by way of example, penetrated by a pattern of rectangular surfaces oriented in parallel.

Figure 4:
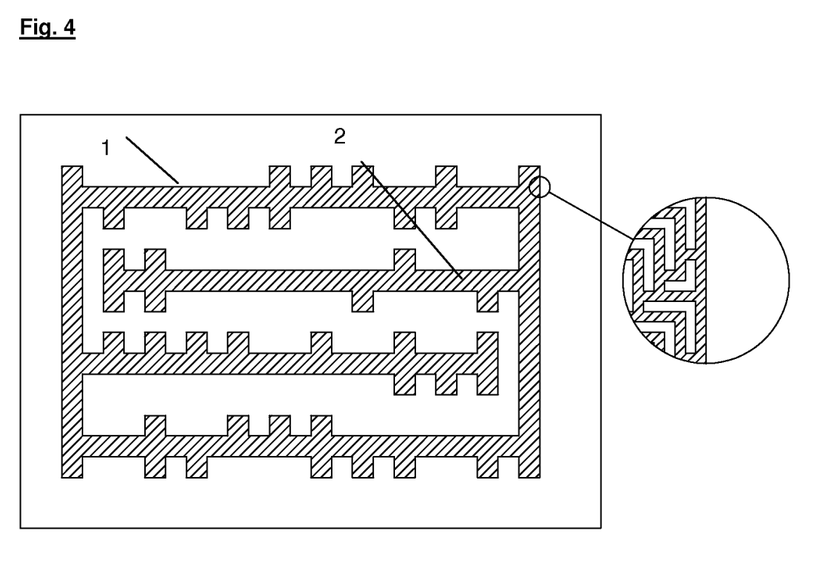
FIG. 4 $4^{th}$ example of an information carrier

FIG. 4 shows a fourth example of an information carrier. An information carrier is shown, consisting of a substrate 1 and an information layer 2. The information layer 2 may, by way of example, be penetrated by a pattern of L-formed surfaces.

Figure 5:
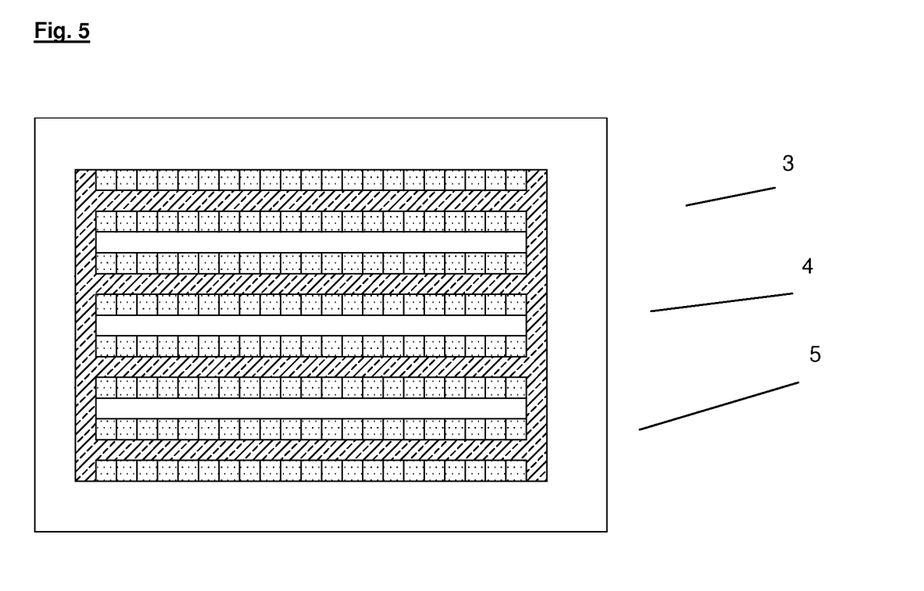
FIG. 5 $1^{st}$ example of a reading device

FIG. 5 shows a first example of a reading device. The reading device layout preferably includes a carrier material or plate 3, an exciter electrode 4 and a reading electrode 5.

Figure 6:
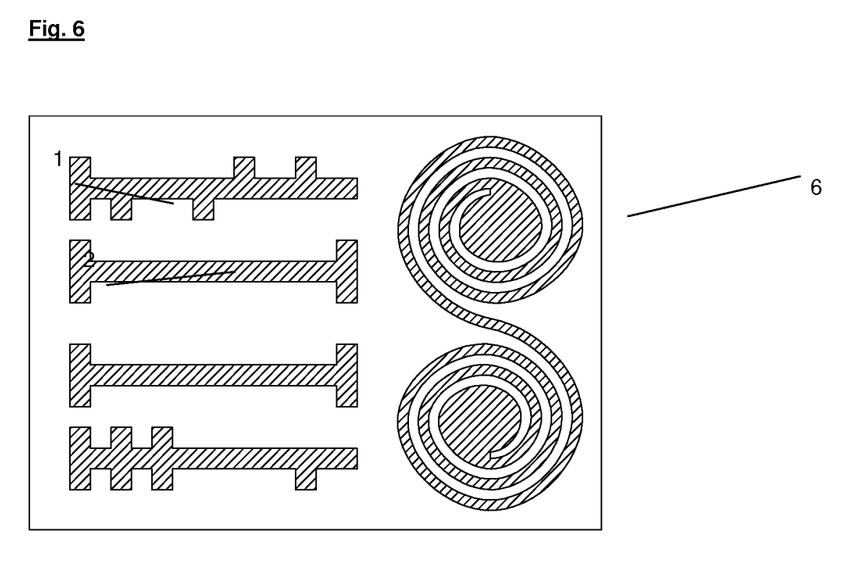
FIG. 6 Example of an information carrier with a security feature

FIG. 6 shows an example of an information carrier with a security feature. The information carrier preferably consists of a substrate 1, an information layer 2 and preferably of a security feature 6.

Figure 7:
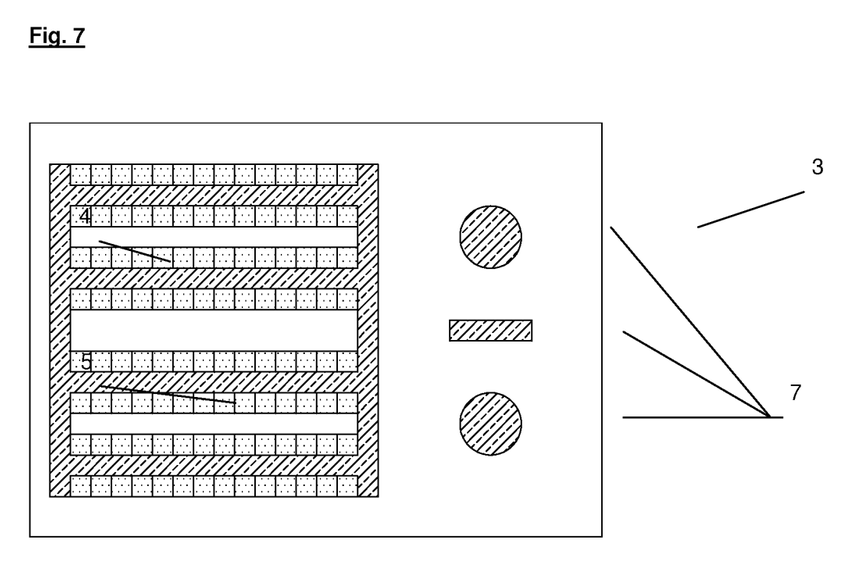

FIG. 7 shows a second example of a reading device. The reading device layout preferably includes a carrier material or plate 3, an exciter electrode 4, a reading electrode 5 and a reading device for a security feature 7. A reading electrode 5 may also be used, for example, for bit recognition.

Figure 8:
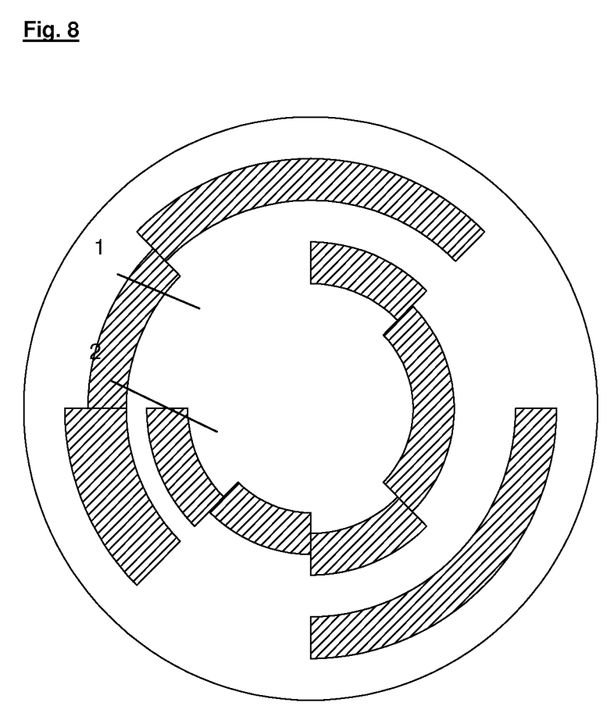

FIG. 8 shows a fifth example of an information carrier. The information carrier preferably includes a substrate 1 and an information layer 2.

Figure 9:
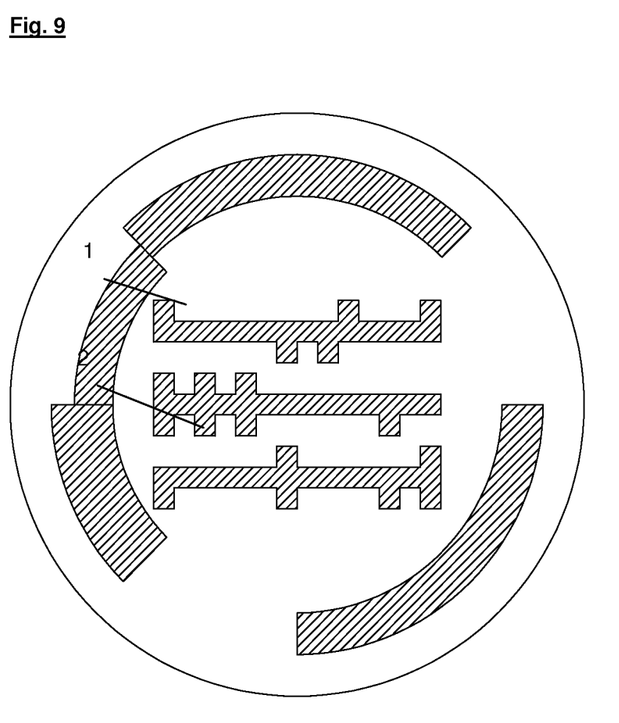

FIG. 9 shows a sixth example of an information carrier. In this case, the information carrier preferably has a substrate 1 and an information layer 2.

Figure 10:
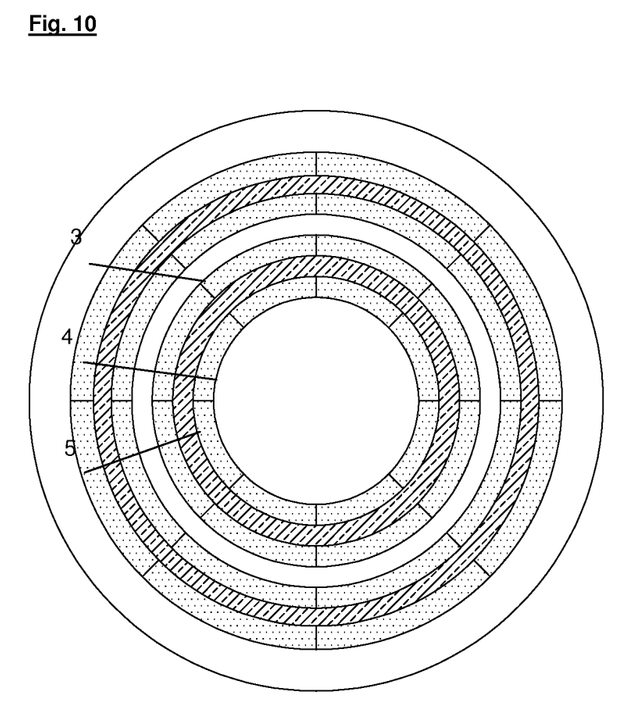

FIG. 10 shows a third example of a reading device. Here a reading device layout is shown by way of example, which may, for example, consist of a carrier material or plate 3, an exciter electrode 4 and a reading electrode 5.

LIST OF REFERENCE NUMBERS 1 substrate
2 structured information layer
3 carrier material or plate
4 exciter electrode
5 reader electrode
6 security feature
7 reading device for security feature

The invention claimed is:

1. Capacitive information carrier comprising
an electrically non-conductive substrate,
an electrically non-conductive adhesive layer which is applied to one or more areas of the substrate, wherein
an electrically conductive structured information layer is arranged on said adhesive layer, wherein the structured information layer is a cold foil and comprises filling areas defined by corners, curves or combinations thereof which include rectangles, circles or combinations thereof, and
at least one additional layer that covers at least the area of the substrate having the structured information layer arranged thereon, wherein said additional layer is a paper layer, a foil layer, a color layer, a lacquer layer or combinations thereof.

2. Information carrier according to claim 1,
wherein
the information layer includes metals, graphite, soot, dielectric materials or combinations thereof.

3. The information carrier according to claim 1,
wherein
the substrate comprises paper, cardboard, timber derived products, composite materials, laminates, synthetic materials or combinations thereof.

4. The information carrier according to claim 1, wherein additional optical, electrical, electronic, sensory, acoustic elements or combinations thereof are located on the information carrier.

5. The information carrier according to claim 1, wherein secondary information is contained on the information carrier.

6. The information carrier, according to claim 1, wherein features and/or elements are incorporated into the information carrier, which contain additional optical information.

7. The information carrier according to claim 6,
wherein the additional optical information are printed values, symbols, signs, safety and authenticity features on playing cards and/or collectors' cards.

8. Group of information carriers, comprising several information carriers
each carrier comprising
an electrically non-conductive substrate,
an electrically non-conductive adhesive layer which is applied to one or more areas of the substrate, wherein
an electrically conductive structured information layer arranged on said adhesive layer, wherein the structured information layer is a cold foil and comprises filling areas defined by corners, curves or combinations thereof which include rectangles, circles or combinations thereof, and
at least one additional layer that covers at least the area of the substrate having the structured information layer arranged thereon, wherein said additional layer is a paper layer, a foil layer, a color layer, a lacquer layer or combinations thereof, wherein
the group of information carriers is closed and has information layers that have identical structure and at least one identically designed color layer so that the group corresponds in terms of information technology and optics,
the group of information carriers has information layers that have identical structure and at least one differently designed color layer so that the group corresponds in terms of information technology but differs in optics,
the group of information carriers has information layers that different structures and at least one identically designed color layer so that the information carriers in the group each have their own information technology but corresponds in terms of optics, or
a group of information carriers has information layers that have different structures and at least one differently designed color layer so that the information carriers in the group are different from one another, with regard to both information technology and optics.

9. Identification system
comprising
at least one information carrier comprising
an electrically non-conductive substrate,
an electrically non-conductive adhesive layer which is applied to one or more areas of the substrate, wherein
an electrically conductive structured information layer is arranged on said adhesive layer, wherein the structured information layer is a cold foil and comprises filling areas defined by corners, curves or combinations thereof which include rectangles, circles or combinations thereof, and
at least one additional layer that covers at least the area of the substrate having the structured information layer arranged thereon, wherein said additional layer is a paper layer, a foil layer, a color layer, a lacquer layer or combinations thereof, and at least one reading device.

10. The identification system according to claim 9, wherein the reading device can is configured to recognize, measure or recognize and measure the information layer, which is applied to one or more areas, and determines the information content of the information carrier.

11. The identification system according to claim 9, wherein
the reading device is configured to determine the position, the form, the area of the structured information layer or combinations thereof and wherein the filling areas represent the information content of a specific number of data carriers.

12. Identification system according to claim 9, wherein said
at least one reading device is interconnected with at least one additional data processing medium.

13. Identification system, according to claim 9, wherein
the reading device comprises either a well, a slit, a surface or combinations thereof to receive at least a part of the information carrier and wherein the information carrier is positioned in, at, or on the reading device in a pre-defined or random way.

14. A method comprising:
providing an information carrier each carrier comprising
an electrically non-conductive substrate,
an electrically non-conductive adhesive layer which is applied to one or more areas of the substrate, wherein
an electrically conductive structured information layer is arranged on said adhesive layer, wherein the structured information layer is a cold foil and comprises filling areas defined by corners, curves or combinations thereof which include rectangles, circles or combinations thereof, and
at least one additional layer that covers at least the area of the substrate having the structured information layer arranged thereon, wherein said additional layer is a paper layer, a foil layer, a color layer, a lacquer layer or combinations thereof and interpreting information contained on the information carrier through its structured information layer via a reading device, wherein the information carrier is optionally part of a group of information carriers or an identification system.

15. The method of claim 14, wherein
the information layers applied may be changed, area by area, in their structuring, via additive, subtractive processes or a combination of additive or subtractive processes, including by inkjet processes, including laser processes.

16. The method according to claim 14, wherein
the structured information layer is read via a reading device having electrodes, wherein an arrangement of the electrodes provides for the recognition, acquisition and further processing of the number, size, form, and/or position of the structured information layer, wherein the information carrier is optionally part of a group of information carriers or an identification system.

17. The method according to claim 14, wherein
the information carrier, in connection with a reading device, is assigned to or triggers, through its or their structured information layer, an action of a data processing system, wherein the information carrier is optionally part of a group of information carriers or an identification system.

18. The method of claim 17, wherein the action is an action on non-networked data processing systems or networked data processing systems.

19. The method according to claim 14, wherein the information carrier is assigned to a record in a data processing device, wherein the record remains constant or changes, wherein the information carrier is optionally part of a group of information carriers or an identification system.

20. The method according to claim 14, wherein
the information carrier is used for playing cards, collectors' cards, stamps, franking, postage, goods routing, goods tracking, admission, entry cards, access to closed areas, virtual contents, marketing applications, customer loyalty, lotteries and games of chance, member identification, time cards, payment applications, certificates of authenticity, certificates, forgery protection, copy protection, signatures, delivery certificates, objects involved in computer games, music/video/e-book downloads, bonus stamps/programs or gift cards, and wherein the information carrier is optionally part of a group of information carriers or an identification system.

21. The method according to claim 14, wherein
the information content is completed and the assignment to another record released only in combination with at least one other information carrier, wherein the information carrier is optionally part of a group of information carriers or an identification system.

22. The method of claim 14, wherein
secondary information is applied or contained on the information carrier, which allows for determination of an orientation or speed of the information carrier relative to the reading device.

* * * * *